United States Patent [19]

Gretz et al.

[11] Patent Number: 4,541,540
[45] Date of Patent: Sep. 17, 1985

[54] THERMALLY INSULATED CHEST

[75] Inventors: Charles Gretz, Suisun, Calif.; Gerald J. Kandel, Baltimore, Md.

[73] Assignee: Life-Like Products, Inc., Baltimore, Md.

[21] Appl. No.: 593,923

[22] Filed: Mar. 27, 1984

[51] Int. Cl.⁴ .......................................... A45C 11/00
[52] U.S. Cl. .................................... 220/20; 220/21; 220/412; 224/202
[58] Field of Search ...................... 220/20, 21, 22, 23, 220/3.1, DIG. 10, 412; 224/202, 257

[56] References Cited

U.S. PATENT DOCUMENTS

| | | | |
|---|---|---|---|
| 45,764 | 1/1865 | Staunton | 62/371 |
| 1,336,776 | 4/1920 | Drinkwater | 206/545 |
| 3,225,983 | 12/1965 | Majka | 224/208 |
| 3,416,694 | 12/1968 | Bebb | 220/21 |
| 3,734,336 | 5/1973 | Rankow et al. | 220/21 |
| 3,799,386 | 3/1974 | Madalin | 220/16 |
| 3,848,766 | 11/1974 | Gantt et al. | 220/412 X |
| 3,850,333 | 11/1974 | Reichert | 220/20 |
| 3,938,688 | 2/1976 | Ryan | 220/23.8 |
| 4,119,248 | 10/1978 | Butler et al. | 224/202 X |
| 4,286,440 | 9/1981 | Taylor | 62/457 |
| 4,351,165 | 9/1982 | Gottsegen et al. | 62/371 |

FOREIGN PATENT DOCUMENTS 619351  3/1949  United Kingdom .

Primary Examiner—Steven M. Pollard
Attorney, Agent, or Firm—Shapiro and Shapiro

[57] ABSTRACT

A thermally insulated foam chest holds hot and cold articles in separate insulated environments. The chest comprises a body separated into two compartments by a partition wall, one compartment being adapted to contain the major portion of a beverage bottle in an upright position. The chest also includes a chest having a pair of recesses adapted to mate selectively with the aforesaid compartment for containing a top portion of the bottle. Dividing wall means between the recesses engages the partition wall irrespective of which recess is mated with the compartment. Portions of a flexible carrying strap, which is secured to abutments on opposite sides of the body, locate within channels on opposite sides of the lid to prevent the lid from falling from the body should the chest be bumped or knocked during transport by means of the carrying strap.

17 Claims, 6 Drawing Figures

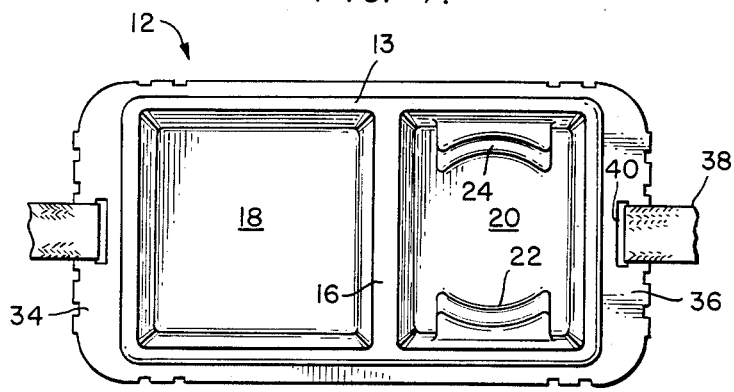
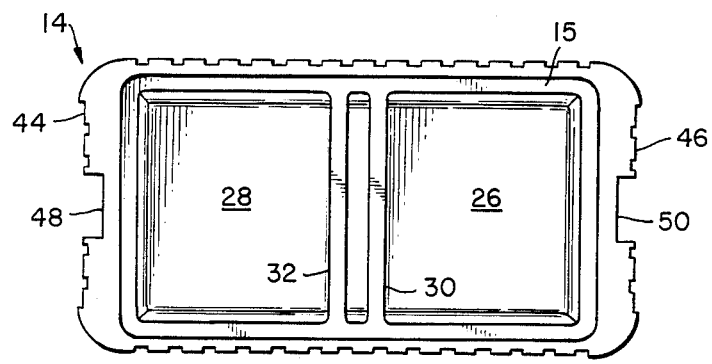
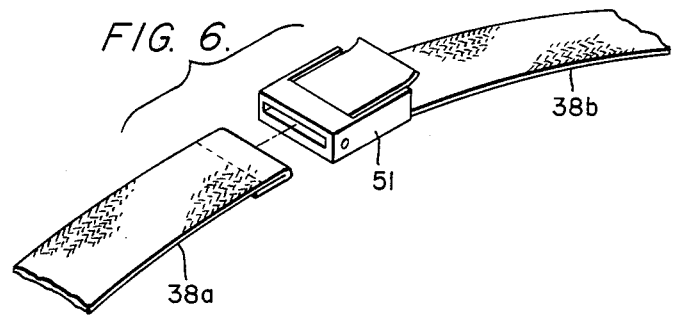

THERMALLY INSULATED CHEST

BACKGROUND OF THE INVENTION

This invention relates to thermally insulated chests and is more particularly concerned with a chest for transporting and/or storing hot and cold articles, for example, in separate thermally insulated environments.

Conventional insulated chests generally comprise a hollow body having but a single compartment for the containment of food and beverages. Such chests, although useful for transporting items which are compatible for storage in the same thermal environment, are often unsuitable or particularly inconvenient for many other uses. It is often desirable, for example, to transport both hot foods and cold beverages to a picnic. Conventional chests are inherently unsuitable for this purpose since hot and cold articles are not compatible for storage in a single insulated compartment. Another problem arises with such chests when it is desired to transport certain items on ice while keeping other items dry (i.e., free from exposure to water created by the melting ice). Usually, the latter items must be placed and kept in plastic bags or other waterproof means for protection. Naturally, this is a source of inconvenience to the user.

An additional drawback of conventional chests is often encountered when it is desired to transport tall beverage bottles. Frequently, a chest will not be of sufficient height to accommodate a tall bottle, and it is thus necessary to place the bottle on its side in the chest. Thereafter, the bottle may be covered over by food and ice, making access to the bottle difficult and requiring disturbance of the food and ice to reach it. Returning the bottle to the chest may also pose a problem as a result of rearrangement of the food and ice when the bottle is removed from the chest.

Chests of the type wherein a lightweight, detachable lid is retained on the body by friction may be subject to yet another problem—loss of the lid during transport. More particularly, while being transported, the chest may be bumped or knocked with sufficient force to overcome the friction between the lid and the body. The lid is then free to fall from the body.

The present invention avoids the foregoing and other problems associated with prior insulated chests.

SUMMARY OF THE INVENTION

Briefly stated, in one of its broad aspects, the invention provides a thermally insulated chest comprising a body and a detachable lid adapted for thermally sealing engagement therewith, the body being divided into a pair of thermally insulated compartments. At least one of the compartments is constructed to receive and hold upright a beverage bottle of height greater than that of the compartment, and the lid is provided with at least one recess adapted to mate with that compartment. The height of the recess is substantially less than that of the compartment, whereby the major portion of the bottle is contained within the compartment and a top portion of the bottle is contained within the recess. In a preferred embodiment, the chest is formed from a rigid, insulating plastic foam. The compartments of the body are separated by a partition wall which is asymmetrically disposed within the body, and the lid has a pair of recesses with the characteristics previously described. The recesses are separated by dividing wall means adapted to engage the partition wall irrespective of which of the recesses is mated with the aforesaid one compartment of the body.

In accordance with another broad aspect of the invention, a thermally insulated chest is provided which comprises a hollow body, a detachable lid adapted to fit on the top of the body and a flexible handle having two ends respectively secured to opposite sides of the body. The lid includes opposite side portions, each provided with a channel wherein a corresponding portion of the handle locates during transport of the chest by suspension from a center portion of the handle. By the foregoing arrangement, the lid is restrained from falling from the top of the body during transport of the chest by means of the handle.

The foregoing and other aspects of the invention will be more fully apparent from the detailed description of the preferred embodiment hereinafter, reference being had to the accompanying drawings.

BRIEF DESCRIPTION OF THE DRAWINGS

FIG. 4 is a top plan view of the body of the chest;

FIG. 5 is a bottom plan view of the lid of the chest; and

FIG. 6 is a fragmentary perspective view of an adjustable flexible handle for the chest.

DETAILED DESCRIPTION OF THE PREFERRED EMBODIMENT

Figure 1:
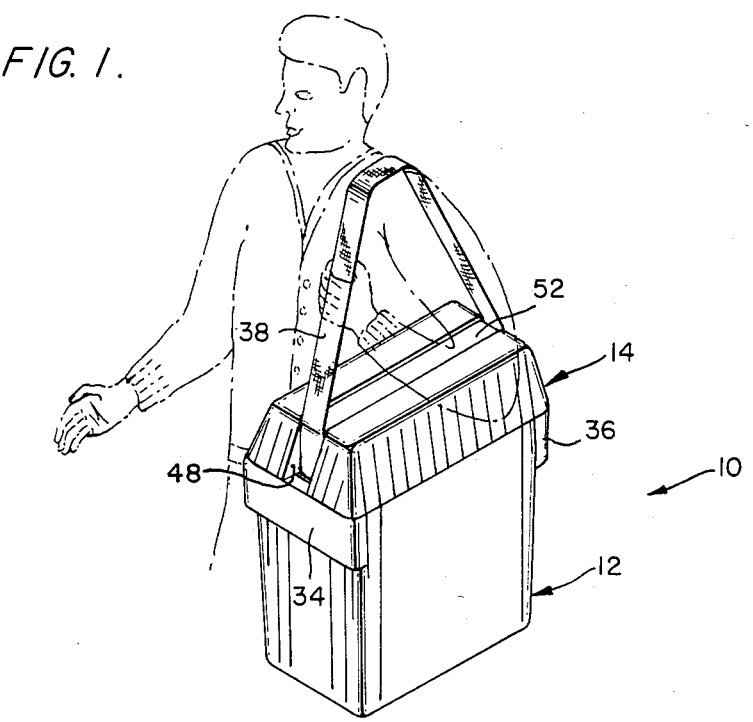
FIG. 1 is a perspective view of a thermally insulated chest according to the present invention, illustrating one manner of transporting the chest.

Referring now in detail to the drawings, reference numeral 10 denotes generally a thermally insulated chest of a preferred form in accordance with the invention. The chest comprises a hollow body 12 and a detachable lid 14 adapted for thermally sealing engagement with the top of the body. In the illustrated embodiment, body 12 is substantially rectangular, with its sides tapered slightly outward from its base, lid 14 being of a complementary configuration, as shown. To provide a strong, lightweight and well insulated structure, the body and lid are preferably formed from a rigid plastic foam such as expanded polystyrene, although it will be apparent that certain advantages of the invention may be obtained with other materials of construction (e.g., a non-rigid insulating foam, such as polyurethane, encased within rigid plastic walls).

Figure 2:
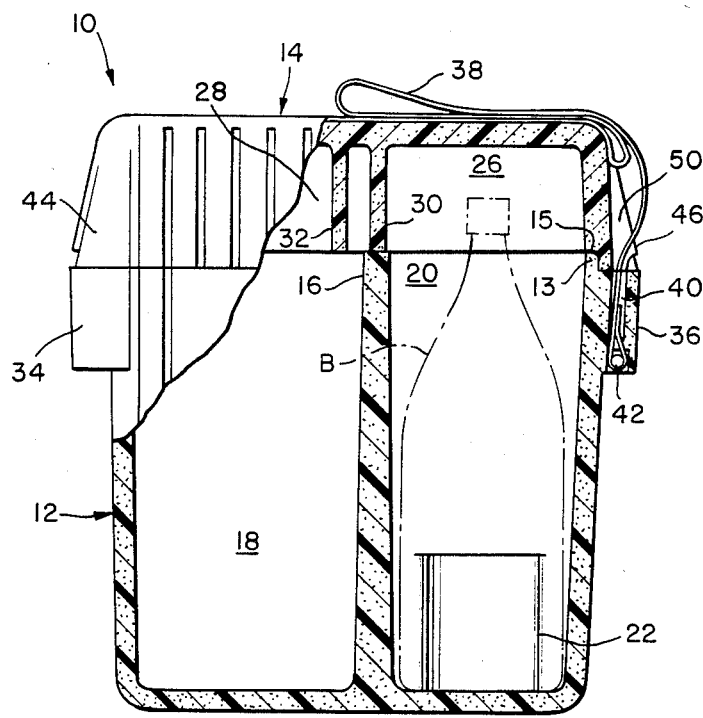
FIG. 2 is a side elevation view of the chest, shown partly in section.

In accordance with the invention as depicted in FIGS. 2 and 4, body 12 includes an integral partition wall 16 which extends perpendicularly between opposite parallel sides of the body to divide it into a pair of compartments 18 and 20. It will be noted that partition wall 16 is asymmetrically disposed within body 12 so that compartment 18 is slightly larger than compartment 20. This provides a storage space (in compartment 18) of sufficient volume to accommodate bulky items such as a box of carry-out fried chicken. For effecting a thermal seal with lid 14, body 12 additionally includes a peripheral flange 13 on its top surface (see FIGS. 2 and 4) which is received by a corresponding groove 15 in the lid (see FIGS. 2 and 5). Friction between the flange and groove acts to hold lid 14 in place on body 12.

Figure 3:
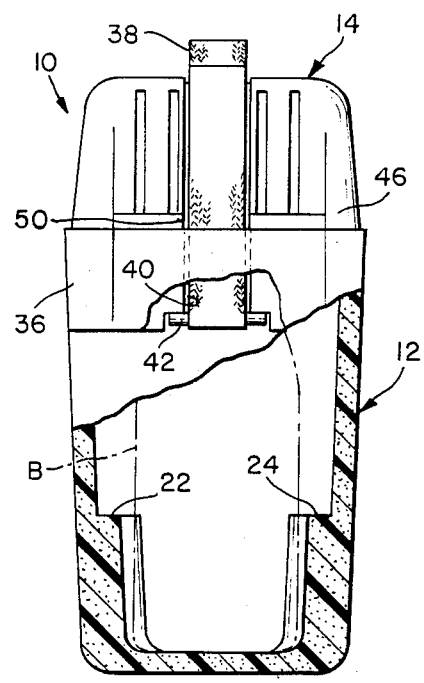
FIG. 3 is another side elevation view of the chest, shown partly in section, the chest being rotated 90° clockwise from its orientation in FIG. 2.

As is best seen in FIGS. 2 and 3, compartment 20 of the body is constructed to receive and hold upright a beverage bottle B (shown in dashed lines) of height greater than that of the compartment. Peripheral rib portions 22 and 24 at opposite sides of compartment 20 engage bottle B laterally for retaining it in an upright position. As shown in FIG. 2, compartment 20 contains the major portion of bottle B, with a top portion of the bottle projecting out of the compartment for ready access.

To contain the top portion of bottle B, lid 14 is provided with at least one recess which is of a height substantially less than that of compartment 20 and which is adapted to mate with compartment 20 in the manner illustrated in FIG. 2. In the form shown, lid 14 includes two such recesses, designated by the reference numerals 26 and 28, respectively (see FIG. 5). The presence of two recesses permits lid 14 to be placed on body 12, selectively, in either of its two possible longitudinal orientations. As will be apparent from FIGS. 2 and 5, recesses 26 and 28 are also adapted to mate with compartment 18, thereby permitting a second bottle to be accommodated in that compartment if desired.

In accordance with the invention, recesses 26 and 28 are separated by dividing wall means adapted to engage partition wall 16 in both orientations of lid 14 on body 12, the dividing wall means herein comprising a pair of substantially parallel dividing walls 30 and 32. Dividing walls 30 and 32 are positioned so that one of the walls will engage partition wall 16 irrespective of the longitudinal orientation of lid 14 on body 12 (i.e., irrespective of which recess 26 or 28 is mated with compartment 20). More particularly, with lid 14 oriented as shown in FIG. 2, recess 26 mates with compartment 20 and dividing wall 30 engages the top of partition wall 16. With the orientation of lid 14 reversed, recess 28 will mate with compartment 20 and dividing wall 32 will engage partition wall 16. It will thus be appreciated that with lid 14 in place on body 12, the interior of chest 10 is separated into two thermally insulated storage chambers by virtue of the engagement of partition wall 16 with either dividing wall 30 or dividing wall 32. This, of course, makes possible the storage of hot and cold articles simultaneously in separate thermal environments within chest 10. Likewise, articles which must be kept dry may be held separately from those kept on ice.

To facilitate transport of the chest 10, body 12 includes at opposite sides integral foam abutments 34 and 36 which may be used as carrying handles. There is also provided a flexible handle, herein depicted as a shoulder strap 38, which is secured at its opposite ends to abutments 34 and 36. FIGS. 2 and 3 illustrate the manner in which the ends of strap 38 are secured to the respective abutments. By way of example, the attachment of strap 38 to abutment 36 will now be described, it being understood, of course, that the opposite end of the strap may be secured to abutment 34 in ah identical manner.

With continued reference to FIGS. 2 and 3, it will be observed that abutment 36 has an opening 40 through which an end of strap 38 is inserted (see also FIG. 4). An anchor, such as a pin 42, is attached to the end of the strap to prevent the withdrawal thereof through opening 40. In the arrangement shown, pin 42 is attached to strap 38 by means of a pocket or loop formed by sewing or otherwise securing the end of the strap to an inward portion thereof. Preferably, opening 40 terminates at a recess, as shown, wherein pin 42 is retained by friction.

Turning now to another feature of the invention, lid 14 includes opposite side portions 44 and 46 which overlap abutments 34 and 36, respectively (see FIGS. 2 and 5). Side portions 44 and 46 include respective channels 48 and 50 (which are preferably substantially vertical), wherein corresponding portions of strap 38 locate during transport of the chest by suspension from a center portion of the strap in the manner depocted in FIG. 1. It will be appreciated that when chest 10 is transported thusly, strap 38 will restrain lid 14 from falling off of body 12 in the event that the lid is bumped or knocked with sufficient force to overcome the friction between flange 13 and groove 15. More particularly, due to the tension on strap 38, the portions thereof located within channels 48 and 50 act as a barrier to longitudinal displacement of the lid. At the same time, those portions of the strap act as stops for the side walls of the channels, thereby limiting lateral displacement of the lid.

FIG. 6 depicts another form of handle which may be incorporated in chest 10. In particular, FIG. 6 shows an adjustable shoulder strap comprising two strap elements 38a and 38b. One end of each strap element is attached to body 12 in the manner previously described in connection with strap 38. The free ends of the strap elements are adjustably connected by means of a buckle 51 which, in the form shown is attached to the free end of strap element 38b. By pulling a sufficient length of strap element 38a through buckle 51, the effective length of strap 38a, 38b may be reduced until the strap is drawn snugly across the top surface of lid 14. When adjusted in this manner, the strap will secure lid 14 upon body 12, thereby preventing accidental detachment of the lid (as may be desired, for example, when carrying chest 10 by means of abutments 34 and 36).

As shown in FIG. 1, the top surface of lid 14 preferably includes a channel 52 which interconnects channels 48 and 50. Channel 52 is adapted to receive the inner portion of the adjusted strap for holding the same laterally in place on the lid. It will be apparent that channel 52 provides a suitable location during shipment of chest 10 for the inner portion of whichever strap 38 or 38a, 38b is incorporated in the chest. The inner portion of strap 38 may be retained in channel 52 by folding that part of the strap on itself and then securing it within the channel by tape or other means. Strap 38a, 38b may simply be adjusted in the manner just described.

Having fully described the structural arrangement of chest 10, it is now appropriate to discuss preferred dimensions for the chest. It has been found most generally desirable to size the chest to accommodate a standard, two-liter plastic beverage bottle in compartment 20. (Compartment 18, being larger, will also accommodate such a bottle.) Appropriate internal dimensions of such a chest (when formed from expanded polystyrene) are: for the body—about 11½ inches long by about 6 inches wide and about 11 inches high, with partition wall 16 being about 11/16 inch thick and positioned to define a length of about 5 inches for compartment 20 and rib portions 22 and 24 defining a diameter of about 4½ inches; and for the lid— recesses 26 and 28 about 5 inches long by about 6 inches wide and about 3 inches high (deep), with dividing walls 30 and 32 being about 7/16 inch thick and spaced about ⅜ inch apart. A thickness of about ¾ inch for the externally exposed walls of the chest (i.e., the sides of the body and lid, the base of the body and the top of the lid) will provide effective insulation as well as good physical strength.

While a preferred form of the invention has been shown and described herein, those skilled in the art will recognize that numerous changes and modifications are possible within the scope of the invention as defined in the appended claims.

We claim:

1. A thermally insulated chest comprising a body and a detachable lid for thermally sealing engagement therewith, said body having a pair of thermally insulated compartments separated by a partition wall asymmetrically disposed within said body with at least one of said compartments being constructed to receive and hold upright a beverage bottle of greater height than that compartment, said lid having a pair of recesses respectively adapted to mate with said compartment and separated by dividing wall means adapted to engage said partition wall irrespective of which of said recesses is mated with said compartment, whereby the major portion of said bottle is contained within said compartment and a top portion of said bottle is contained within the recess mated with said compartment.

2. A thermally insulated chest in accordance with claim 1, wherein said compartment includes peripheral rib portions adapted to engage said bottle laterally for retaining said bottle in an upright position.

3. A thermally insulated chest in accordance with claim 1, further comprising a flexible handle and wherein said body includes a pair of abutments disposed externally on opposite sides thereof, said flexible handle being secured at opposite ends to said abutments.

4. A thermally insulated chest in accordance with claim 3, wherein each of said abutments has an opening therethrough and wherein a respective end of said handle is inserted through said opening, said end having attached thereto anchor means adapted to prevent the withdrawal of that end through said opening.

5. A thermally insulated chest in accordance with claim 3, wherein said lid includes opposite side portions which overlap said abutments, said side portions each having a channel adapted for the location of a corresponding portion of said handle therein during transport of the chest by suspension from a center portion of said handle, whereby said lid is restrained by said handle from falling off of said body.

6. A thermally insulated chest in accordance with claim 3, wherein said handle is adjustable to permit the same to be drawn snugly across the top surface of said lid for preventing accidental detachment of said lid from said body.

7. A thermally insulated chest comprising a hollow body having a partition wall asymmetrically disposed therein for dividing said body into a pair of compartments and a detachable lid adapted to be fitted to the top of said body in either of two orientations, selectively, said lid having a pair of recesses adapted to mate with said pair of compartments, said recesses being separated by dividing wall means adapted to engage said partition wall in both of said orientations of the lid.

8. A thermally insulated chest in accordance with claim 7, wherein said body and said lid are formed from a rigid plastic foam.

9. A thermally insulated chest in accordance with claim 7, wherein said dividing wall means comprises a pair of substantially parallel walls positioned in such a manner that one of said walls engages said partition wall in one of said orientations of the lid and the other of said walls engages said partition wall in the other of said orientations.

10. A thermally insulated chest in accordance with claim 7, wherein said body is substantially rectangular and wherein said partition wall extends substantially perpendicularly between two opposing sides thereof.

11. A thermally insulated chest in accordance with claim 7, wherein at least one of said compartments is adapted to contain the major portion of a beverage bottle in upright position and wherein each of said recesses is adapted to contain the remaining portion of said bottle when mated with the said one compartment.

12. A thermally insulated chest in accordance with claim 11, wherein said compartment includes peripheral rib portions adapted to engage said bottle laterally for retaining said bottle in an upright position.

13. A thermally insulated chest in accordance with claim 7, further comprising a flexible handle and wherein said body includes a pair of abutments projecting outward from respective opposite sides thereof, said handle being secured at opposite ends to said abutments.

14. A thermally insulated chest in accordance with claim 13, wherein each of said abutments includes an opening therethrough and wherein said opposite ends of the handle are inserted through the openings of said abutments, respectively, said opposite ends having anchor means attached thereto for preventing the withdrawal thereof through the respective openings.

15. A thermally insulated chest in accordance with claim 13, wherein said lid includes opposite side portions which overlap said abutments, said side portions each having a channel in which a corresponding portion of said handle locates during transport of said chest by suspension from a center portion of the handle, whereby said handle restrains said lid from falling from the top of said body.

16. A thermally insulated chest in accordance with claim 13, wherein said handle is adjustable to lie snugly across the top surface of said lid for preventing accidental detachment of said lid from said body.

17. A thermally insulated chest in accordance with claim 1, wherein said body and said lid are formed from a rigid plastic foam.

* * * * *